United States Patent
Väänänen et al.

(10) Patent No.: US 7,836,190 B2
(45) Date of Patent: Nov. 16, 2010

(54) SHARED IP MULTIMEDIA RESOURCE RESERVATION

(75) Inventors: Kai Väänänen, Espoo (FI); Frans Tuomela, Helsinki (FI)

(73) Assignee: Teliasonera AB, Stockholm (SE)

( * ) Notice: Subject to any disclaimer, the term of this patent is extended or adjusted under 35 U.S.C. 154(b) by 63 days.

(21) Appl. No.: 11/921,528

(22) PCT Filed: Jun. 5, 2006

(86) PCT No.: PCT/FI2006/050235

§ 371 (c)(1),
(2), (4) Date: Dec. 3, 2007

(87) PCT Pub. No.: WO2006/131598

PCT Pub. Date: Dec. 14, 2006

(65) Prior Publication Data

US 2009/0207789 A1 Aug. 20, 2009

(30) Foreign Application Priority Data

Jun. 6, 2005 (FI) .................................. 20055286

(51) Int. Cl.
*G06F 15/16* (2006.01)
*H04L 12/40* (2006.01)

(52) U.S. Cl. ........................ 709/227; 709/218; 709/249; 370/439

(58) Field of Classification Search .................. 709/218, 709/227, 249; 370/310, 439
See application file for complete search history.

(56) References Cited

U.S. PATENT DOCUMENTS 6,643,284 B1 * 11/2003 Inoue et al. ................. 370/352

(Continued)

FOREIGN PATENT DOCUMENTS

WO WO 2005/107210 A1 11/2005

OTHER PUBLICATIONS

Cuevas, M: "Admission control and resource reservation for session-based applications in next generation networks" BT Technology Journal, Kluwer Academic Publishers, DO, vol. 23, No. 2, Apr. 1, 2005, pp. 130-145.
Shacham, R., Schulzrinne, H. Columbia University, Thakolsri, S., Kellerer, W., DoCoMo Eurolabs "Session Initiation Protocol (SIP) Session Mobility; draft-sacham-sippling-session-mobility-00. txt", IETF Standard-Working-Draft, Internet Engineering Task Force, IETF, CH, Feb. 14, 2005.

*Primary Examiner*—Ranodhi N Serrao
(74) *Attorney, Agent, or Firm*—Cohen Pontani Lieberman & Pavane LLP

(57) ABSTRACT

The invention is based on the idea of managing multimedia resource reservation by a solution in which, for a first user terminal, a first media terminal is searched and reserved, and a multimedia session is started. A multimedia session request is transmitted from the first user terminal to a second user terminal via an IMS subsystem. A second media terminal is searched and reserved for the second user terminal. The information on the reserved second media terminal is transmitted via the IMS to the first user terminal, which informs the first media terminal of the reserved second media terminal. After that, real-time data traffic can be transmitted via an IP network, e.g., the Internet, between the first media terminal and the second media terminal.

28 Claims, 5 Drawing Sheets

U.S. PATENT DOCUMENTS

| | | |
|---|---|---|
| 2002/0062379 A1* | 5/2002 | Widegren et al. ............ 709/227 |
| 2003/0014367 A1* | 1/2003 | Tubinis ....................... 705/64 |
| 2003/0210678 A1 | 11/2003 | Haukka |
| 2004/0085949 A1 | 5/2004 | Partanen et al. |
| 2004/0253957 A1* | 12/2004 | Pelaez et al. ................. 455/445 |
| 2005/0071459 A1* | 3/2005 | Costa-Requena et al. ... 709/224 |

* cited by examiner

SHARED IP MULTIMEDIA RESOURCE RESERVATION

PRIORITY CLAIM

This is the U.S. national stage of application No. PCT/FI2006/050235, filed on 5 Jun. 2006. Priority is claimed on the following application: Finland, Application No.: 20055286, Filed 6 Jun. 2005, the content of which is incorporated herein by reference.

FIELD OF THE INVENTION

The present invention relates to managing IP (Internet protocol) multimedia resource reservation.

BACKGROUND OF THE INVENTION

An IP multimedia subsystem (IMS) is a telecommunications network subsystem providing IP multimedia services that complement the services provided by mobile networks. The IMS enables the support for IP multimedia applications within the third generation mobile systems by enabling mobile network operators to offer multimedia services based on Internet applications, services and protocols. These protocols include a Session initiation protocol SIP, which is used to manage the IP multimedia sessions. Users of the IMS technology may utilize applications like presence services, interactive applications, content sharing and real-time video. Also push-to-talk connections are based on the IMS technology. Any network supporting the IP protocol may be utilized in the IMS technology. Examples of such networks include GPRS (General packet radio service), WCDMA (Wideband code division multiple access), WLAN (Wireless local area network) and B-ISDN (Broadband integrated services digital network) networks.

The IMS technology also enables a solution where a local IP multimedia resource, such as a multimedia PC (personal computer) connected to the Internet, is reserved and controlled by means of a user terminal, such as a mobile station connected to the IMS network.

BRIEF DESCRIPTION OF THE INVENTION

It is an object of the present invention to provide an enhanced method for managing local multimedia resource reservation for a multimedia session, and a system and an apparatus for implementing the method. The objects of the invention are achieved by a method and an arrangement, which are characterized by what is stated in the independent claims. The preferred embodiments of the invention are disclosed in the dependent claims.

The invention is based on the idea of managing multimedia resource reservation by a solution in which a multimedia session is established by means of a first and a second media resource connected to a first IP network, and a first and a second user terminal connected to a second IP network including an IMS network. At first, for the first user terminal, the first media resource is searched and reserved by the first user terminal, and a multimedia session is started. A multimedia session request and information on the reserved first media resource is transmitted from the first user terminal to the second user terminal via the IMS network. The first information and said multimedia session request is received in the second user terminal. The second media resource is searched and reserved by the second user terminal, and the second user terminal informs the user of the received multimedia session request. If the request is accepted by the user, the information on the reserved second media resource is transmitted via the IMS to the first user terminal, which informs the first media resource of the reserved second media resource. After that, data traffic can be transmitted via the first IP network between the first media resource and the second media resource.

An advantage of the method and arrangement of the present solution is that it enables shared multimedia resource reservation for terminals which do not otherwise have this capability. It enables "dumb" media terminals with different network addresses to find each other by means of the signaling of "intelligent" user terminals using the IMS.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The present solution is, for example, applicable to so-called peer-to-peer (P2P) transmission situations. A P2P computer network refers to a network that relies on the computing power at the ends of a connection rather than in the network itself. A peer-to-peer transfer network may have, instead of clients or servers, equal peer nodes that simultaneously function as both "clients" and "servers" to the other nodes in the network. This model of network arrangement differs from the client-server model where communication is usually to and from a central server.

A real-time transport protocol (RTP) is one of the Internet protocols, designed to provide end-to-end network transport functions for applications transmitting real-time data, such as audio, video, or simulation data, over multicast or unicast network services. The RTP provides services such as payload type identification, sequence numbering, time stamping, and delivery monitoring to real-time applications.

A real-time transport control protocol (RTCP) is a protocol that monitors the quality of service (QoS) of a real-time transport protocol (RTP) connection and conveys information about an on-going session.

A session description protocol (SDP) is a protocol which conveys information about media streams in multimedia sessions to allow recipients of a session description to participate in the session. The SDP is primarily intended for use in an inter-network, although it is sufficiently general that it can describe conferences in other network environments.

A call session control function (CSCF), which may also be referred to as a call state control function, is a function that performs call control functions, service switching functions, address translation functions, and negotiation functions. The CSCF is the main call control element in the IP multimedia subsystem. The CSCF comprises a serving CSCF (S-CSCF) and an interrogating CSCF (I-CSCF).

A proxy call session control function (P-CSCF) refers to a role of the CSCF of being the first contact point to access to the IP multimedia subsystem.

Figure 1:
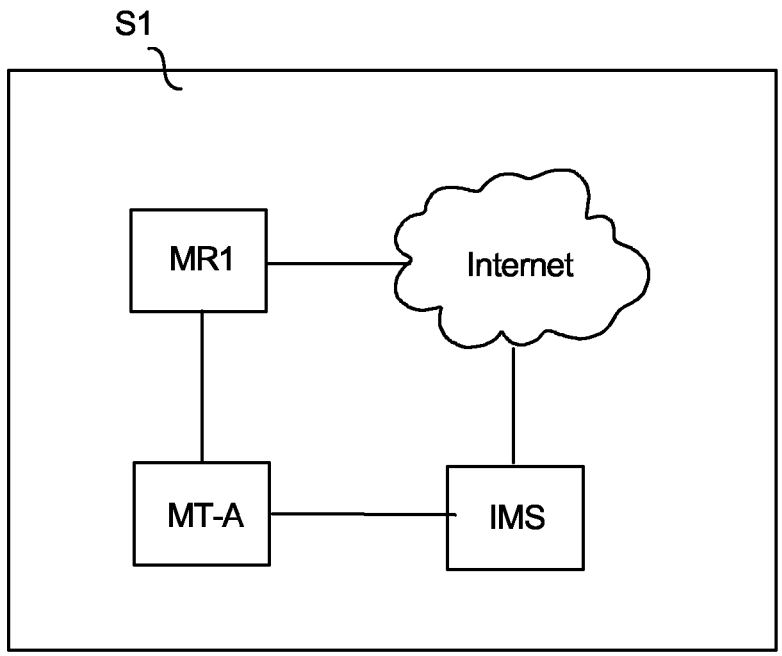
FIG. 1 illustrates the system of the invention.
Figure 2:
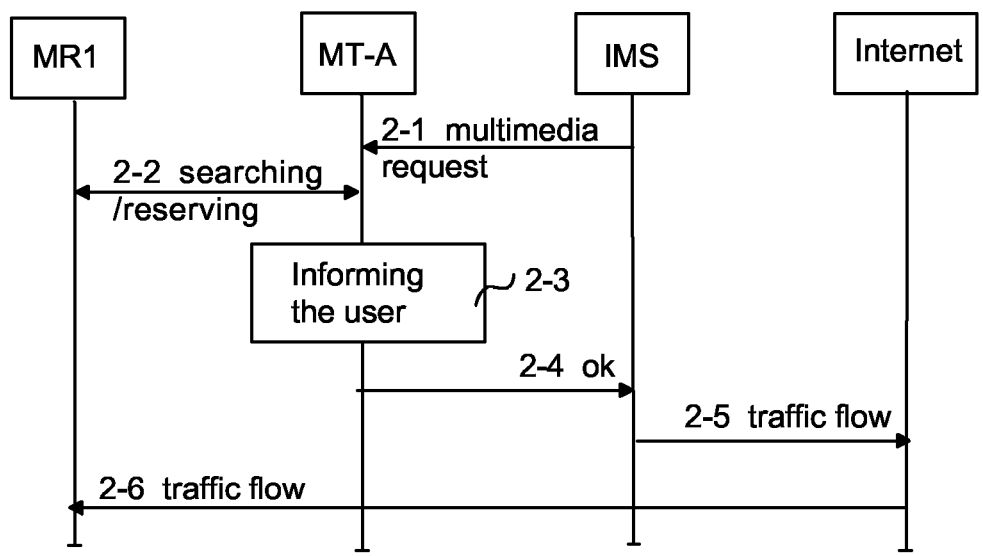
FIG. 2 is a signaling chart illustrating the invention.
Figure 3:
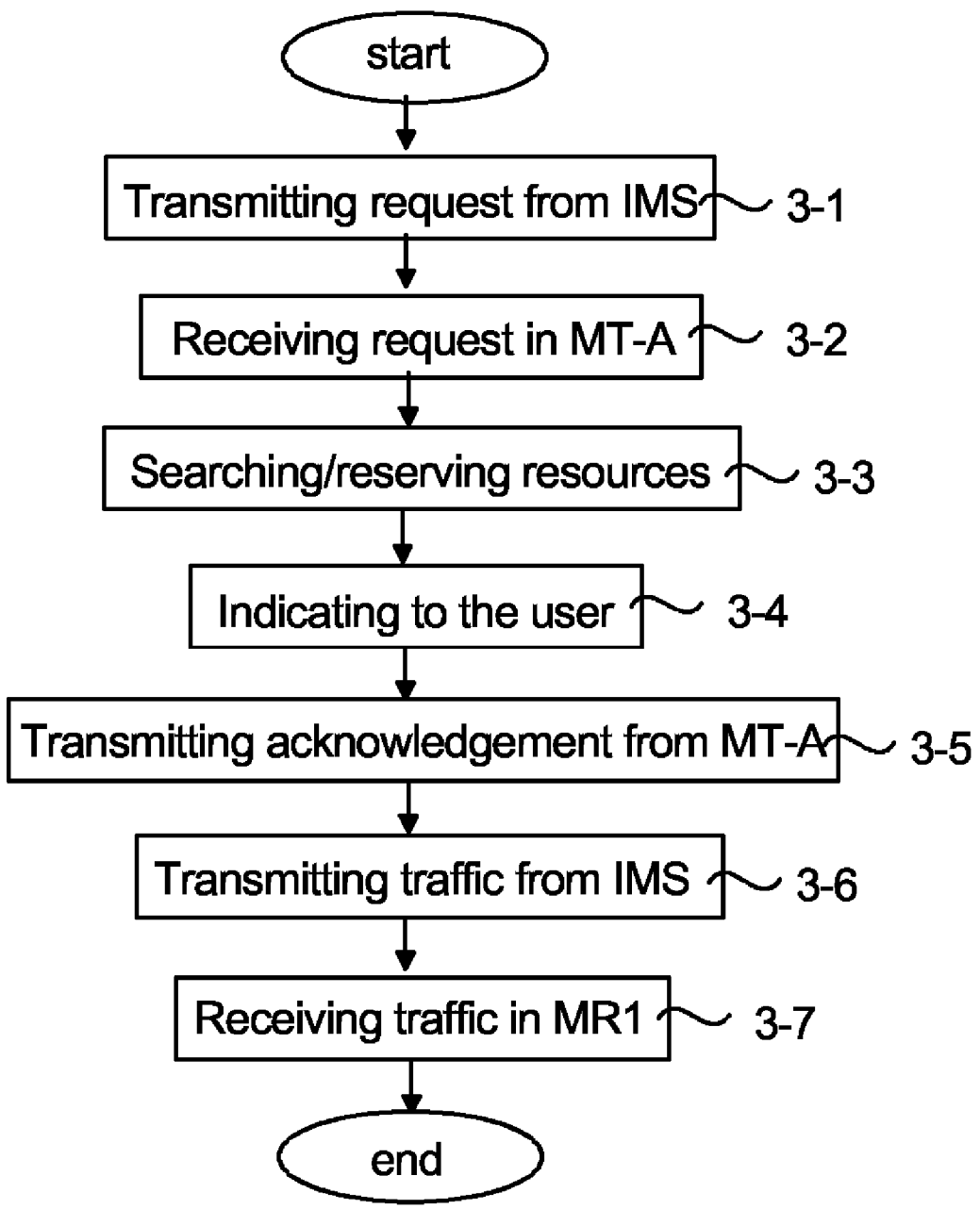
FIG. 3 is a flow chart illustrating the invention.

In FIGS. 1, 2 and 3, a media resource reservation solution is disclosed involving one user terminal, which may be a mobile terminal, such as a mobile phone, PDA (Personal digital assistant), laptop or the like, and one media terminal, which may also be referred to as a media resource.

Referring to FIG. 1, the telecommunications system S1 comprises a user terminal MT-A that may use a local shared IP multimedia resource for incoming and/or outgoing IP multimedia sessions. The shared IP multimedia resource refers to a resource that comprises e.g. a voice/video transmitter or receiver in a media terminal MR1 managed by the first terminal MT-A (e.g. using a MRCP (Media resource control protocol)) via local wireless access means (e.g. IR (Infrared), Bluetooth). In addition, the user terminal MT-A functions as an originator/terminator for the incoming/outgoing IP multimedia control plane traffic, while the media terminal MR1 works as an originator/terminator for the user plane traffic (e.g. RTP/RTCP). The user terminal MT-A may also partly function as an originator/terminator for user plane traffic, e.g. voice, while the media terminal MR1 originates/terminates video. The system S1 comprises a first IP network, such as the Internet, and a second IP network (not shown) including a IP multimedia subsystem IMS. The first and the second IP networks may or may not be parts of a same IP network. The MT-A is able to connect to the IMS, and the MR1 is able to connect to the Internet. The media terminal MR1 may comprise, for example, a television or a digital television or the like. The IMS may further include a monitoring node (AS1, not shown).

Referring to FIGS. 2 and 3, the MT-A receives 3-2 a multimedia session request 2-1, transmitted 3-1 by the IMS, requiring e.g. video and/or voice receiving capabilities. The MT-A searches 2-2, 3-3 the above multimedia resources (e.g. via IR, Bluetooth) and reserves them if available. It should be noted that the MT-A may execute the multimedia resource search and reservation process before an incoming/outgoing multimedia session request (e.g. when the terminal enters to a new space). The MT-A informs 2-3, 3-4 the user about the incoming multimedia request. The user may accept the multimedia session, and after that the MT-A sends 2-4, 3-5 an acknowledgement including information on the reserved multimedia resource, such as information on the IP address, a listening port and/or a media codec type. In messages 2-5, 2-6 (step 3-7), user-plane traffic may flow from the IMS via the Internet to the MR1.

Figure 4:
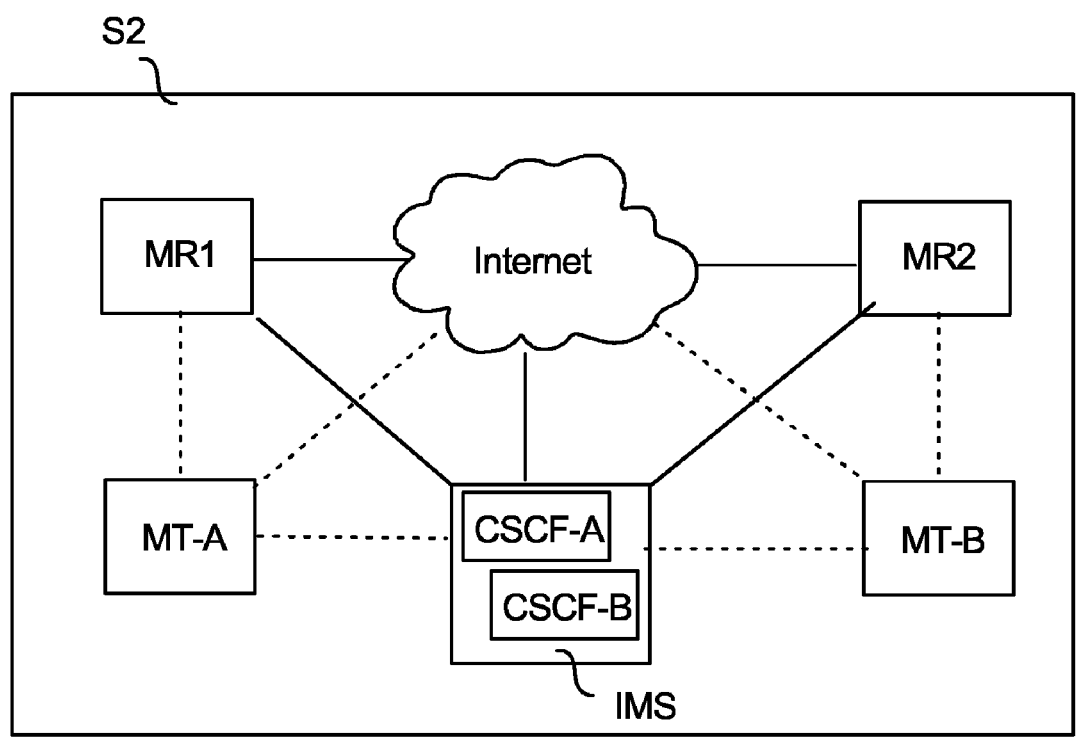
FIG. 4 illustrates the system of the invention.
Figure 5:
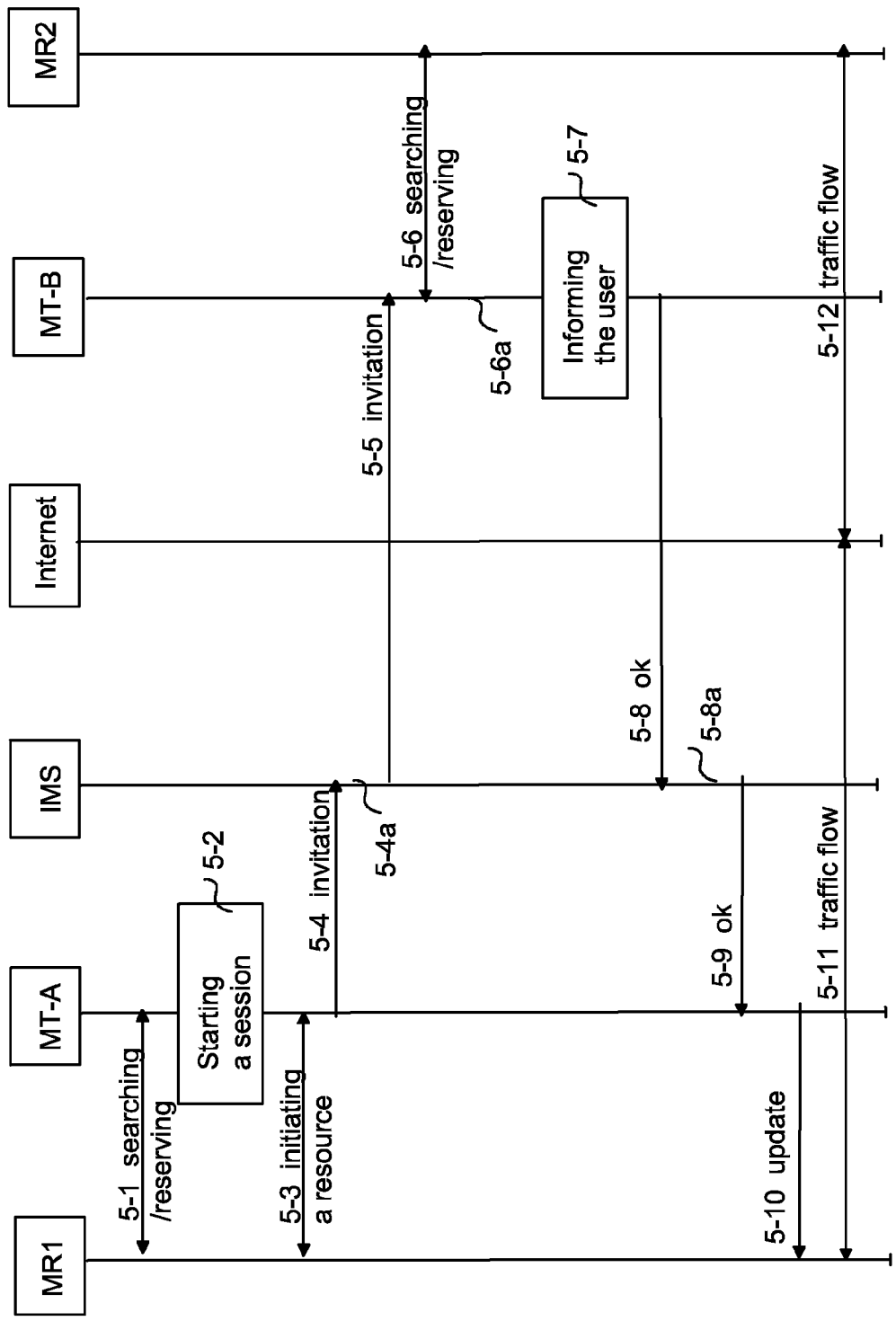
FIG. 5 is a signaling chart illustrating the invention.
Figure 6:
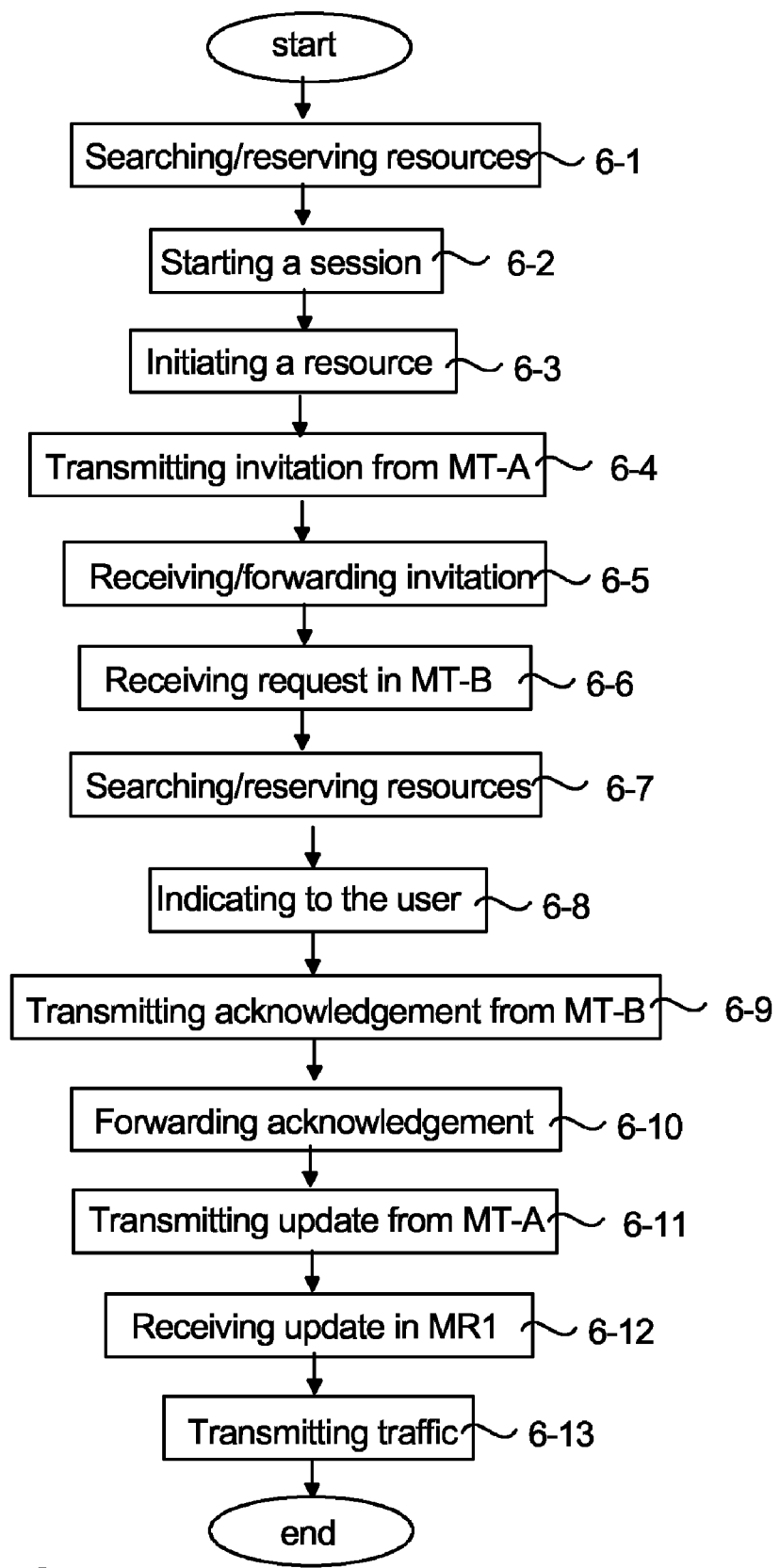
FIG. 6 is a flow chart illustrating the invention.

In FIGS. 4, 5 and 6, a media resource reservation process is disclosed involving at least two user terminals and at least two media terminals.

Referring to FIG. 4, the telecommunications system S2 according to the present solution comprises a user terminal MT-A, MT-B that may be a mobile terminal, such as a mobile phone, PDA, laptop or the like, and use a local shared IP multimedia resource for incoming and/or outgoing IP multimedia sessions. The shared IP multimedia resource refers to a resource that comprises e.g. a voice/video transmitter or receiver in a first media terminal MR1, managed by the first user terminal MT-A, and a second media terminal MR2, managed by the second user terminal MT-B. In addition, the user terminal MT-A, MT-B functions as an originator/terminator for the incoming/outgoing IP multimedia control plane traffic, while the media terminal MR1, MR2 works as an originator/terminator for the user plane traffic (e.g. RTP/RTCP). The user terminal MT-A, MT-B may also partly function as an originator/terminator for user plane traffic, e.g. voice, while the second terminal originates/terminates video. The system S2 comprises a first IP network, such as the Internet, and a second IP network (not shown) that includes an IP multimedia subsystem IMS. The first and the second IP network may be parts of a same or a different IP network. The MT-A and MT-B are able to connect to the IMS, and the MR1 and MR2 are able to connect to the Internet. The media terminal MR1, MR2 may comprise, for example, a television or a digital television or the like. The IMS may include a control node CSCF-A, CSCF-B comprising a call session control function, and/or a monitoring node (AS1, AS2, not shown).

Referring to FIGS. 5 and 6, the MT-A searches 5-1, 6-1 for local multimedia resources (e.g. via IR, Bluetooth) and reserves them from the MR1, and a multimedia session is started 5-2, 6-2 with the reserved multimedia capabilities. Then the MT-A initiates 5-3, 6-3 the specific multimedia resource MR1 with e.g. an IPsec key, listening port and media codec type. The MT-A sends 6-4, 6-5 a session invitation 54, 5-5, including a multimedia session request and information on reserved multimedia resources MR1, to the MT-B via the IMS. The MT-B receives 6-6 the multimedia session request requiring e.g. video/voice transmitting/receiving capabilities. Then the MT-B searches 5-6, 6-7 the multimedia resources from the MR2 (e.g. via IR, Bluetooth) and reserves them. The MT-B may also have searched and reserved the multimedia resources from the MR2 before receiving the multimedia session request. The MT-B may inform 5-7, 6-8 its user about the incoming multimedia request. The user may accept the request, and after that the MT-B sends 6-9, 6-10 an acknowledgement 5-8, 5-9 with information on the MT-B's reserved multimedia resource MR2 to the MT-A via the IMS. By message 5-10 the MT-A may send 6-11 an update of the information on the reserved MR2 to the MR1, which receives it in step 6-12. In message 5-11, 5-12 (step 6-13) user plane traffic (e.g. RTP/RTCP) may flow between the MT-B's reserved multimedia resource MR2 and the MT-A's reserved multimedia resource MR1 (until the SIP session is closed).

Also a solution is disclosed which enables detecting, preventing and managing situations where P2P applications try to abuse the IMS network. The abuse could happen so that the IMS network and services of an operator are used for the media resource reservation, while another access network is then used during the data transmission. This other access network could be e.g. a cheaper network that the IMS operator is not able to manage in terms of charging, security, etc.

According to an embodiment, in connection with the step 54 of transmitting said first information from the first user terminal MT-A, a first session description protocol SDP, or some other suitable session protocol, is built 5-3a for the MT-A on the basis of the first information. The first session description protocol SDP is provided 54 (e.g. in a SIP message) to the IMS, which then checks 54a the validity of the content of the first session description protocol SDP (e.g. the IP addresses of the transmitter and/or the receiver may be checked). The checking may be carried out by the IMS nodes CSCF-A and/or AS1. If the first session description protocol SDP is not valid (e.g. the IP address in the SIP message does not belong to a trusted network), the IMS node in question may cancel the resource reservation process for the session, or modify the first session description protocol SDP. The information of the reserved media resource MR1 may also be transmitted in a SIP message overhead, without using the SDP. In this case the whole SIP message should be checked for validity.

According to another embodiment, in connection with the step 5-8 of transmitting said second information from the MT-B, a second session description protocol SDP, or some other suitable session protocol, is built 5-6a for the MT-A on the basis of the second information. The second session description protocol SDP is provided 5-8 (e.g. in a SIP message) to the IMS, which then checks 5-8a the validity of the content of the second session description protocol SDP (e.g.

the IP addresses of the transmitter and/or the receiver may be checked). The checking may be carried out by the IMS nodes CSCF-B and/or AS2. If the second session description protocol SDP is not valid (e.g. the IP address in the SIP message does not belong to a trusted network), the IMS node in question may cancel the resource reservation process for the session, or modify the second session description protocol SDP.

According to yet another embodiment, in step 5-8 said second information may also be transmitted in a SIP message overhead, without using the SDP. In this case the whole SIP message should be checked for validity. If the SIP message overhead is not valid (e.g. the IP address does not belong to a trusted network), the IMS node in question may cancel the resource reservation process for the session, or modify the SIP message.

According to yet another embodiment, the present solution involves controlling data transmission between the MR1 and the MR2 such that the media resources and the user terminals are located in different IP networks (which may not be connected to each other). The present solution enables two or more users to receive a common multimedia service in respective media terminals MR1, MR2 connected to an IP-based telecommunications network, such as the Internet, by utilizing respective mobile terminals MT-A, MT-B connected to another IP-based telecommunications network, such as the IMS. The present solution also enables the receipt of the multimedia service in a secured manner.

According to yet another embodiment, the present solution enables a situation where a first user (using the MR1 and MT-A) is having a multimedia session with a second user (using the MR2 and MT-B), wherein voice is transmitted and/or received by means of the MT-A (and/or MT-B) while video is transmitted and/or received by means of the MR1 (and/or MR2).

According to yet another embodiment, the present solution comprises media resource reservation of an audio/video application during or before a session invitation (such as a SIP invite between the user terminal and the IMS), configuration of media reception, e.g. IPsec keys, listening ports, codec types, and configuration of media transmission, e.g. IPsec keys, ports, codec types, destination address.

According to yet another embodiment, the user terminal MT-A manages the resource reserved in the media terminal MR1 during the whole session (utilizing the MRCP protocol).

According to yet another embodiment, the present solution comprises a step of reconfigurating the media resource reservation by updating e.g. codec and media types during the session.

According to yet another embodiment, the present solution comprises testing of the media resource reservation between MR1 and AS1, MR2 and AS2, MR1 and MR2, and MT-A and MT-B.

According to yet another embodiment, the present solution comprises transmitting real-time data traffic.

An example of a situation where the present solution may be utilized is when a user of MT-A would like to play a computer video game with a user of MT-B. The user of MT-A may check, by means of the MT-A, the presence status of the user of MT-B. If, according to the presence status, the user of MT-B is also willing to play, an invitation may be sent from the MT-A to the MT-B via the IMS, as described above in connection with FIGS. 5 and 6. The MT-A searches (e.g. using the Bluetooth) the information on the MR1 and sends it to the MT-B in a SIP message. Both the networks which the MT-A and MT-B are connected to check whether the information on the MR1 is allowable. If the information on the MR1 is allowable and if there is a computer, having the video game in question, available to the MT-B, the MT-B may search information on the MR2 and send it to the MT-A. Again both the networks should check whether the information on the MR2 is allowable. If also the information on the MR2 is allowable, then the MR1 and MR2 may start the communication via the Internet (e.g. by utilizing ADSL (Asymmetric digital subscriber line)).

Another example of a situation where the present solution may be utilized is cooperation between a network operator and a service operator in a situation where the network operator and the service operator have a contract with each other according to which the service operator may use their services in the fixed network while utilizing the IMS of the network operator. By means of the present solution, the starting of the session may be directed to the fixed network of the service operator in a secured manner.

The signaling messages and steps shown in FIGS. 2, 3, 5 and 6 are not in an absolute chronological order and they may be executed in an order different from the given one. Other signaling messages may be transmitted and/or other functions may be carried out between the messages and/or steps. The signaling messages are only examples and may include only some of the aforementioned information. The messages may also include some other information. The names of the messages can also differ from the aforementioned ones. It is not essential in which signaling messages the information is transmitted, but it is also possible to use messages other than those described above.

In addition to prior art devices, the system, network nodes or terminals implementing the operation according to the present solution comprise means for media resource reservation as described above. Existing network nodes and terminals comprise processors and memory, which may be used in the functions according to the invention. All changes necessary for implementing the invention can be carried out by means of software routines that can be added or updated and/or routines contained in application specific integrated circuits (ASIC) and/or programmable circuits, such as an electrically programmable logic device (EPLD) or a field programmable gate array (FPGA).

It will be obvious to a person skilled in the art that, as the technology advances, the inventive concept can be implemented in various ways. The invention and its embodiments are not limited to the examples described above but may vary within the scope of the claims.

The invention claimed is:

1. A method for managing shared local multimedia resource reservation for a multimedia session in a telecommunications system, wherein the telecommunications system comprises:
   a first IP network,
   a second IP network comprising an IP multimedia subsystem, the IP multimedia subsystem including at least one control node,
   a first and a second user terminal connected to the IP multimedia subsystem,
   a first media terminal connected to the first IP network, the first media terminal being capable of providing at least one local multimedia resource to the first user terminal, and
   a second media terminal connected to the first IP network, the second media terminal being capable of providing at least one local multimedia resource to the second user terminal;
   the method comprising:
   searching and reserving the first media terminal for the first user terminal;

searching and reserving the second media terminal for the second user terminal;

transmitting, from the first user terminal to the second user terminal via the at least one control node, a multimedia session request and first information on the reserved first media terminal;

receiving said first information and said multimedia session request in the second user terminal; and indicating, to the user of the second user terminal, the received multimedia session request;

wherein, after said request is accepted by the user, the method further comprises:

transmitting, from the second user terminal to the first user terminal via the at least one control node, second information on the reserved second media terminal;

transmitting said second information from the first user terminal to the first media terminal; and based on said first and second information, transmitting, via the first IP network, data traffic between the first media terminal and the second media terminal.

2. The method according to claim 1, wherein the step of transmitting said first information from the first user terminal comprises:

building, based on the first information, a first session protocol for the first user terminal; and providing the first session protocol to the IP multimedia subsystem;

the method comprising, as the first session protocol is received in the IP multimedia subsystem, checking the validity of the content of the first session protocol.

3. The method according to claim 2, the method comprising if the first and/or the second session protocol is not valid, then canceling by the IP multimedia subsystem the resource reservation for the session.

4. The method according to claim 2, the method comprising if the first and/or the second session protocol is not valid, modifying by the IP multimedia subsystem the session protocol.

5. The method according to claim 2, wherein said checking is carried out in said at least one control node.

6. The method according to claim 2, wherein said checking is carried out in a first monitoring node located in the IP multimedia subsystem.

7. The method according to claim 2, wherein said checking is carried out in a second monitoring node located in the IP multimedia subsystem.

8. The method according to claim 1, wherein the step of transmitting said second information from the second user terminal comprises:

building, based on the second information, a second session protocol for the second user terminal; and providing the second session protocol to the IP multimedia subsystem;

the method comprising, as the second session protocol is received in the IP multimedia subsystem, checking the validity of the content of the second session protocol.

9. The method according to claim 1, further comprising the step of providing said first information from the first user terminal to the IP multimedia subsystem in an overhead of a first SIP message, wherein, as the first SIP message is received in the IP multimedia subsystem, checking the validity of the overhead of the first SIP message.

10. The method according to claim 6, the method comprising if the overhead of the first and/or the second SIP message is not valid, then canceling by the IP multimedia subsystem the resource reservation for the session.

11. The method according to claim 9, the method comprising if the overhead of the first and/or the second SIP message is not valid, then modifying by the IP multimedia subsystem the SIP message.

12. The method according to claim 1, further comprising the step of providing said second information from the second user terminal to the IP multimedia subsystem in an overhead of a second SIP message, wherein, as the second SIP message is received in the IP multimedia subsystem, comprises checking the validity of the overhead of the second SIP message.

13. The method according to claim 1, wherein the method comprises transmitting real-time data traffic.

14. A telecommunications system for providing multimedia services, comprising:

a first IP network;

a second IP network comprising an IP multimedia subsystem, the IP multimedia subsystem including at least one control node;

a first and a second user terminal connected to the IP multimedia subsystem;

a first media terminal connected to the first IP network, capable of providing at least one local multimedia resource to the first user terminal; and a second media terminal connected to the first IP network, capable of providing at least one local multimedia resource to the second user terminal;

the first user terminal being configured to search and reserve the first media terminal for the first user terminal;

the second user terminal being configured to search and reserve the second media terminal for the second user terminal;

the first user terminal being configured to transmit, from the first user terminal to the second user terminal via the at least one control node, a multimedia session request and first information on the reserved first media terminal; and the second user terminal being configured to receive said first information and said multimedia session request in the second user terminal and to indicate to the user of the second user terminal the received multimedia session request;

wherein the second user terminal is configured to, after said request is accepted by the user, transmit, from the second user terminal to the first user terminal via the at least one control node, second information on the reserved second media terminal;

the first user terminal being configured to transmit said second information from the first user terminal to the first media terminal; and the first media terminal and the second media terminal being configured to transmit, via the first IP network, data traffic between the first media terminal and the second media terminal based on said first and second information.

15. The system according to claim 14, wherein the first user terminal is configured to build, based on the first information, a first session protocol for the first user terminal and to provide the first session protocol to the IP multimedia subsystem; and the IP multimedia subsystem is configured check the validity of the content of the first session protocol.

16. The system according to claim 15, wherein said first session protocol is a session description protocol (SDP).

17. The system according to claim 14, wherein the second user terminal is configured to build, based on the second information, a second session protocol for the second user terminal and to provide the second session protocol to the IP multimedia subsystem; and the IP multimedia subsystem being configured check the validity of the content of the second session protocol.

18. The system according to claim 15, wherein the IP multimedia subsystem is configured to, if the first session protocol is not valid, cancel the resource reservation for the session.

19. The system according to claim 15, wherein the IP multimedia subsystem is configured to, if the first session protocol is not valid, modify the session protocol.

20. The system according to claim 17, wherein said second session protocol is a session description protocol (SDP).

21. The system according to claim 14, wherein said control node comprises a call session control function (CSCF).

22. The system according to claim 14, wherein said control node comprises a serving call session control function (S-CSCF).

23. The system according to claim 14, wherein said control node comprises an interrogating call session control function (I-CSCF).

24. The system according to claim 14, wherein said control node comprises a proxy call session control function (P-CSCF).

25. The system according to claim 14, wherein said control node is located in the network serving the first user terminal.

26. The system according to claim 14, wherein said control node is located in the network serving the second user terminal.

27. The system according to claim 14, wherein said first IP network and said IP multimedia subsystem are located in different IP networks.

28. The system according to claim 14, wherein said first IP network and said IP multimedia subsystem are located in a same IP network.

* * * * *